(12) United States Patent
Chen et al.

(10) Patent No.: US 8,222,559 B2
(45) Date of Patent: Jul. 17, 2012

(54) AUTOMATIC SOLDERING MACHINE

(75) Inventors: Sung-Lin Chen, Taipei Hsien (TW); Xiao-Lin Wu, Taipei Hsien (TW); Shaobo Zhang, Taipei Hsien (TW); Zai-Wei Zou, Taipei Hsien (TW); Jun Ma, Taipei Hsien (TW)

(73) Assignee: Cheng Uei Precision Industry Co. Ltd., Taipei Hsien (TW)

( * ) Notice: Subject to any disclaimer, the term of this patent is extended or adjusted under 35 U.S.C. 154(b) by 459 days.

(21) Appl. No.: 12/627,091

(22) Filed: Nov. 30, 2009

(65) Prior Publication Data

US 2011/0127240 A1    Jun. 2, 2011

(51) Int. Cl.
*B23K 1/00* (2006.01)

(52) U.S. Cl. .................. 219/85.19; 219/85.1; 219/118; 219/129; 219/221; 219/227; 219/228; 219/229; 219/230; 219/231; 219/232; 228/51; 228/52; 228/54; 228/55; 269/58; 269/71; 269/903; 318/135

(58) Field of Classification Search ............... 219/85.1, 219/85.19, 118, 129, 221, 227–232; 228/51–55; 269/58, 71, 903; 318/135
See application file for complete search history.

(56) References Cited

U.S. PATENT DOCUMENTS

| | | | | |
|---|---|---|---|---|
| 4,805,830 A | * | 2/1989 | Kawaguchi | 228/180.5 |
| 5,831,247 A | * | 11/1998 | Hidaka | 219/388 |
| 2004/0104694 A1 | * | 6/2004 | Nakamoto et al. | 318/135 |
| 2011/0252935 A1 | * | 10/2011 | Welsh | 83/37 |

* cited by examiner

*Primary Examiner* — Asok Sarkar
(74) *Attorney, Agent, or Firm* — WPAT, P.C.; Anthony King

(57) ABSTRACT

An automatic soldering machine includes a frame assembly, an electric iron and a movable module fixed on the frame assembly. The movable module is used for making the electric iron connected with the movable module randomly move to a specified position at a predetermined area. The movable module includes a first driving unit having a first leading element movable along a first axis, a second driving unit having a second leading element movable along a second axis perpendicular to the first axis, a third driving unit having a third leading element movable along a third axis perpendicular to the first and second axis and a rotating unit capable of rotating around an axis thereof. The third driving unit is connected with the first leading element. The second driving unit is connected with the third leading element. The rotating unit is connected with the second leading element.

11 Claims, 7 Drawing Sheets

AUTOMATIC SOLDERING MACHINE

BACKGROUND OF THE INVENTION

1. Field of the Invention

The present invention generally relates to an automatic soldering machine, and more particularly to an automatic soldering machine capable of making an electric iron thereof randomly moving to a specified position at a predetermined area.

2. The Related Art

At present, a soldering machine is widely used in manufacture. A conventional soldering machine substantially includes an electric iron, a sending tin module connected with the electric iron and sending tin to the electric iron, and a support frame used for supporting the electric iron and the sending tin module. A soldered means is placed on a working plane and under the electric iron for being soldered. However, when the soldered means is located on the working plane with a little offset from the electric iron, the soldering machine should be turned with an angle by manual operation for soldering the soldered means so that makes the soldering process complicated. Therefore, a soldering machine capable of making an electric iron thereof randomly moving to a specified position at a predetermined area is required.

SUMMARY OF THE INVENTION

An object of the present invention is to provide an automatic soldering machine controlled by a controlling module. The automatic soldering machine includes a frame assembly, an electric iron and a movable module fixed on the frame assembly. The movable module is used for making the electric iron which is connected with the movable module randomly move to a specified position at a predetermined area. The movable module includes a first driving unit having a first leading element movable along a first axis, a second driving unit having a second leading element movable along a second axis perpendicular to the first axis, a third driving unit having a third leading element movable along a third axis perpendicular to the first and second axis and a rotating unit capable of rotating around an axis thereof. The third driving unit is connected with the first leading element. The second driving unit is connected with the third leading element. The rotating unit is connected with the second leading element. The electric iron is fixed with one end of the rotating unit.

As described above, the automatic soldering machine utilizes the movable module for making the electric iron randomly move to a specified position at a predetermined area so as to make the soldering process simple.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
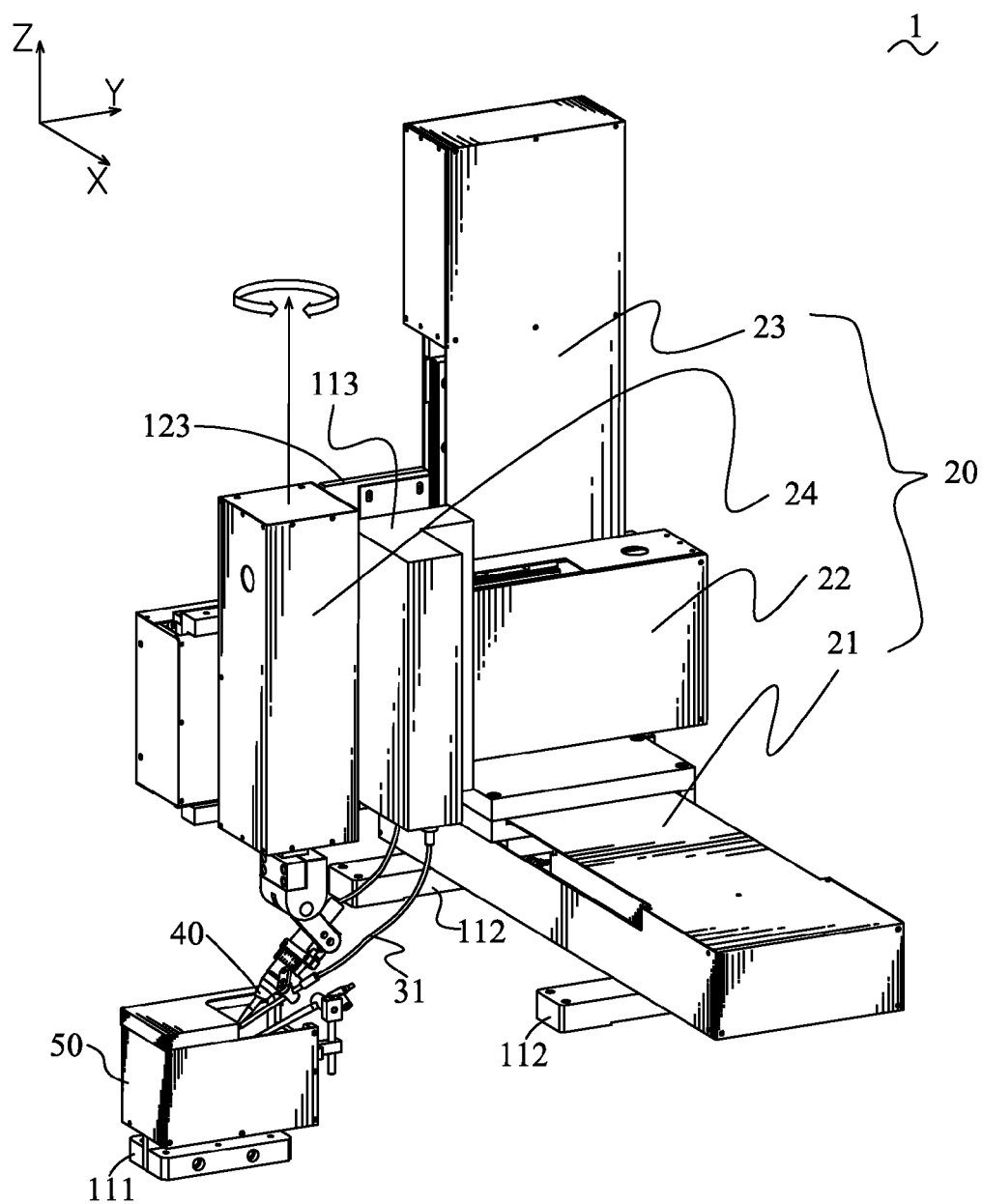
FIG. 1 is a perspective view of an automatic soldering machine in accordance with the present invention.
Figure 2:
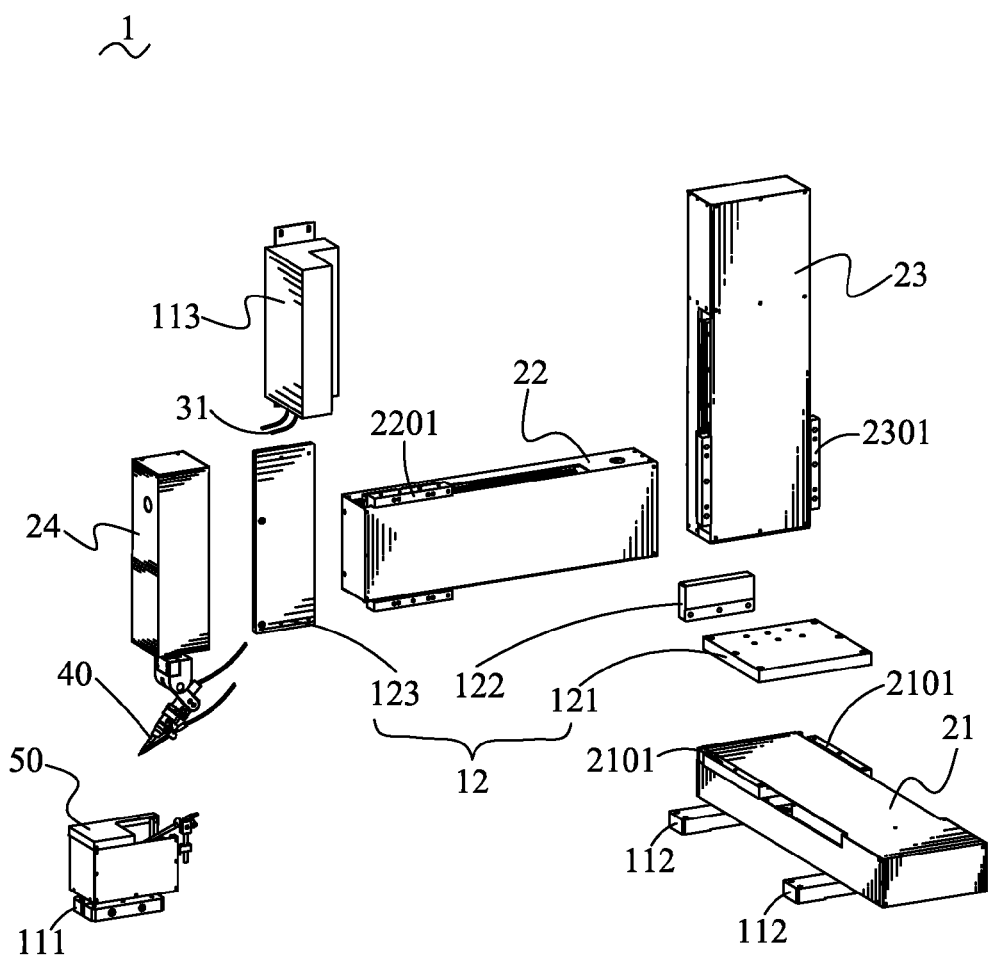
FIG. 2 is an exploded view of the automatic soldering machine of FIG. 1.

Referring to FIG. 1 and FIG. 2, an automatic soldering machine 1 according to the present invention is shown. The automatic soldering machine 1 includes a frame assembly, an omnidirectional movable module 20, a sending tin module (not shown), an electric iron 40 and an automatic cleaning module 50. The automatic soldering machine 1 is controlled by a controlling module (not shown). The controlling module includes a temperature controlling module for controlling a temperature of the electric iron 40 and a programming controlling module for controlling the electric operation and parameter settings of the automatic soldering machine 1.

Referring to FIG. 2, the frame assembly includes a base frame and a support frame 12. The base frame has a rectangular base board 111 disposed levelly, a pair of supporting bars 112 disposed levelly and a substantial rectangular receiving device 113. The support frame 12 has a first support panel 121, a second support panel 122 and a third support panel 123.

Figure 3:
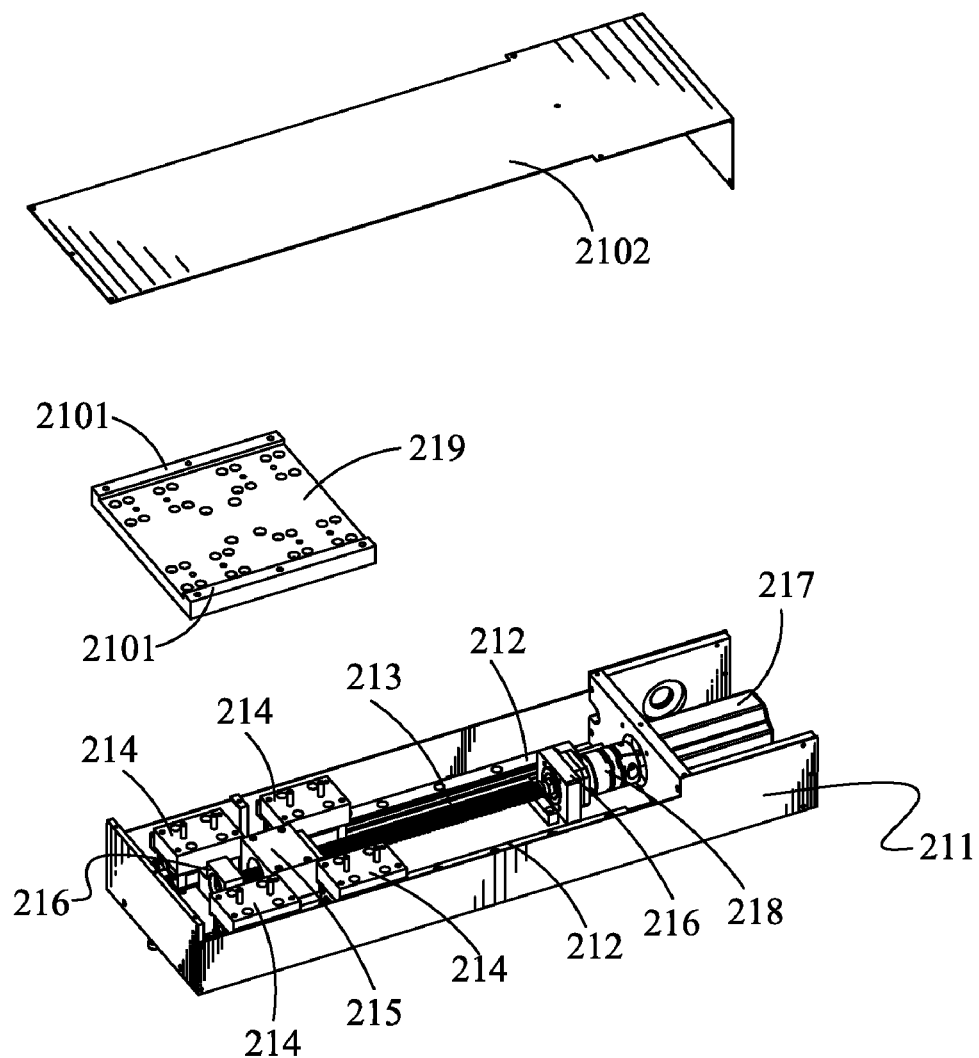
FIG. 3 is a perspective view of a first driving unit of the automatic soldering machine of FIG. 1.

With reference to FIGS. 1-3, the omnidirectional movable module 20 includes a first driving unit 21, a second driving unit 22, a third driving unit 23 and a rotating unit 24. The first driving unit 21 has a rectangular first box 211 with a substantial rectangular first cover 2102 removably mounted to edges of four sideboards thereof. The first box 211 is fixed on the pair of support bars 112 of the frame assembly paralleling to each other. A first threaded shaft 213 is located in the middle of the first box 211. A pair of first rails 212 is located at two opposite sides of the first threaded shaft 213. The first rails 212 and the first threaded shaft 213 parallel to one other. The first threaded shaft 213 is provided with a first sliding block 215 movably mounted thereon. Each of the first rails 212 is provided with a pair of first guiding blocks 214 movably mounted thereon. The first sliding block 215 is disposed among the four first guiding blocks 214. A pair of first holding blocks 216 is held at two opposite ends of the first threaded shaft 213 for holding the first threaded shaft 213 in the first box 211 firmly. A first motor 217 is connected with one end of the first threaded shaft 213 through the first holding block 216 and further connected with the programming controlling module. A first clutch 218 is connected between the first motor 217 and the corresponding first holding block 216. The first holding blocks 216, the first motor 217 and the first clutch 218 are aligned with the axis of the first threaded shaft 213. A rectangular first leading element of board shape 219 is fixed on the four first guiding blocks 214 and the first sliding block 215. Two opposite edge portions of the first leading element 219 are protruded perpendicularly to form a pair of first holding walls 2101 paralleling to the first threaded shaft 213. The first cover 2102 is further located between the two first holding walls 2101 of the first leading element 219 with the two first holding walls 2101 exposed out of the first box 211. The first threaded shaft 213 rotates when the first motor 217 starts for making the first sliding block 215 move along the first threaded shaft 213 so that make the first leading element 219 move along the first threaded shaft 213 and further make the four first guiding blocks 214 move along the respective first rails 212.

Figure 4:
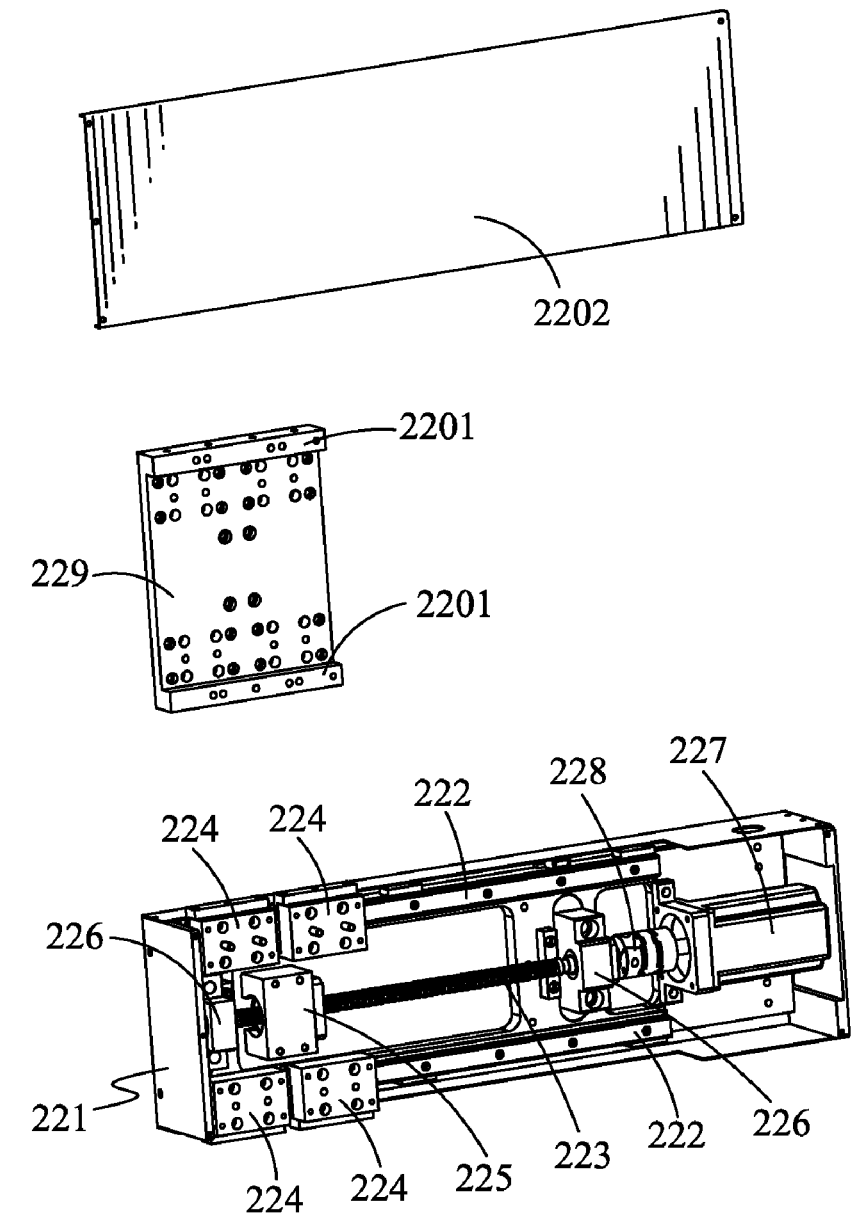
FIG. 4 is a perspective view of a second driving unit of the automatic soldering machine of FIG. 1.

Referring to FIG. 1, FIG. 2 and FIG. 4, the construction of the second driving unit 22 is substantially the same with the first driving unit 21. The second driving unit 22 has a second box 221, a pair of second rails 222, a second threaded shaft 223, four second guiding blocks 224, a second sliding block 225, a pair of second holding blocks 226, a second motor 227, a second clutch 228, a second leading element of board shape 229, a pair of second holding walls 2201 and a second cover 2202.

Figure 5:
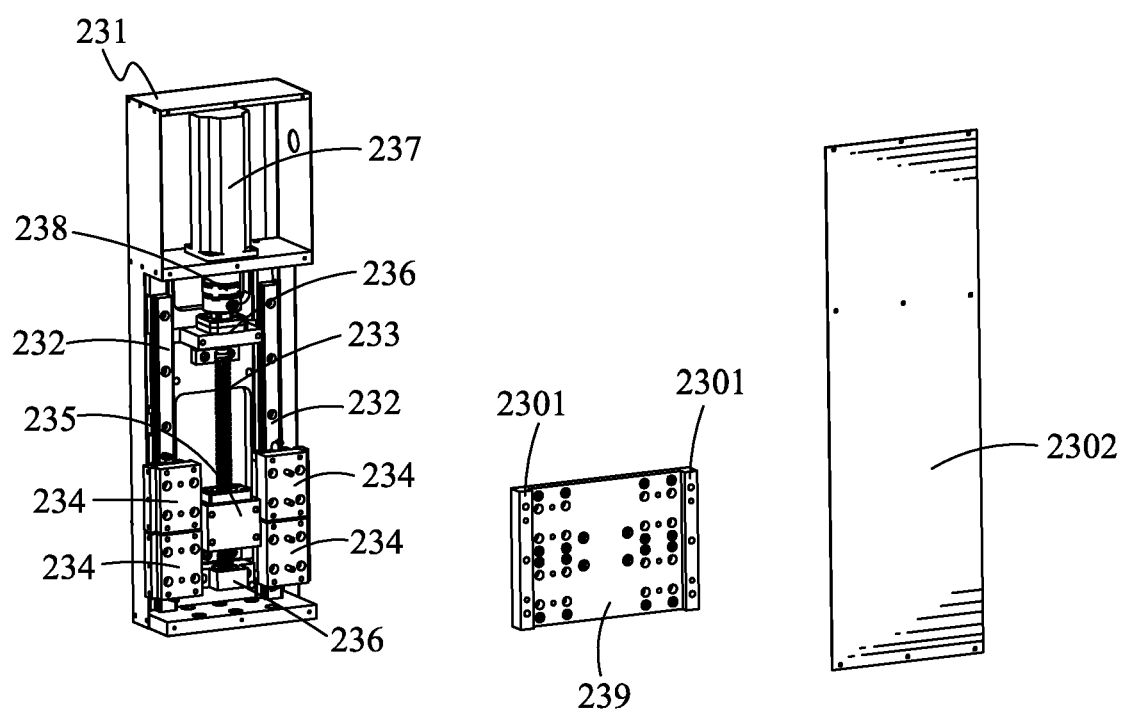
FIG. 5 is a perspective view of a third driving unit of the automatic soldering machine of FIG. 1.

Referring to FIG. 1, FIG. 2 and FIG. 5, the construction of the third driving unit 23 is substantially the same with the first driving unit 21. The third driving unit 23 has a third box 231, a pair of third rails 232, a third threaded shaft 233, four third guiding blocks 234, a third sliding block 235, a pair of third holding blocks 236, a third motor 237, a third clutch 238, a third leading element of board shape 239, a pair of third holding walls 2301 and a third cover 2302.

Figure 6:
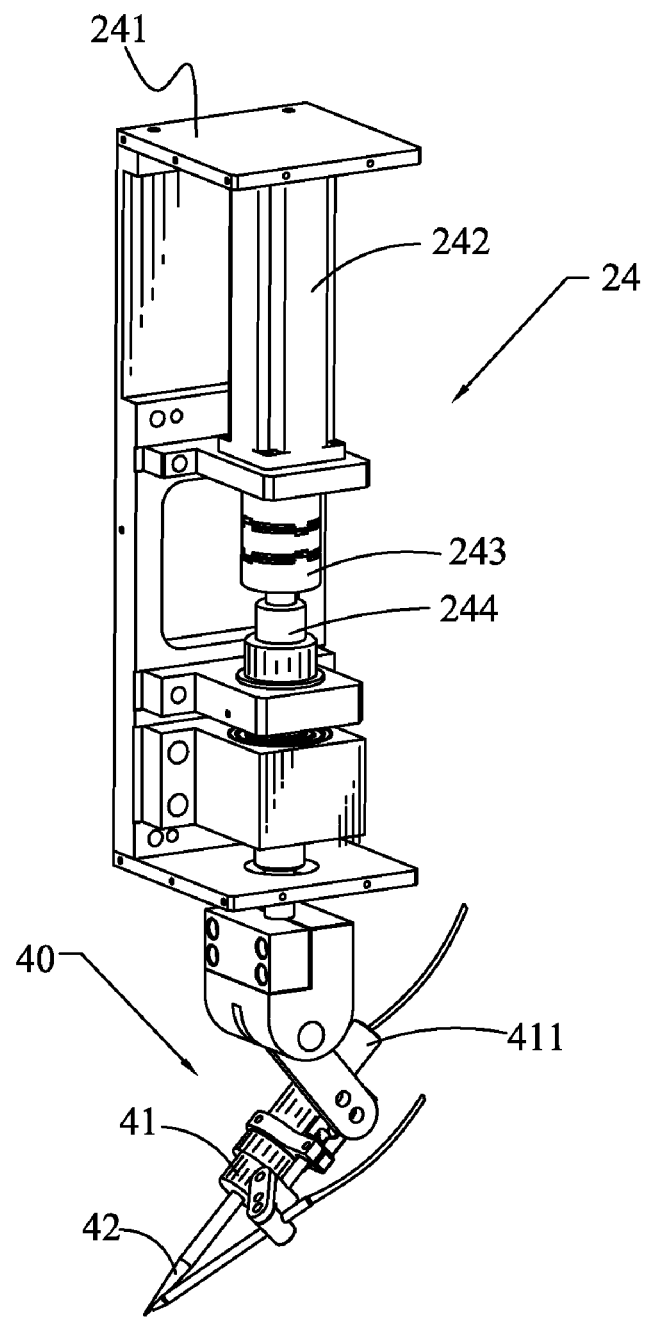
FIG. 6 is a perspective view of a rotating unit of the automatic soldering machine of FIG. 1, with part of a fourth box of the rotating unit hided for showing an inner structure of the rotating unit.

Referring to FIG. 1, FIG. 2 and FIG. 6, the rotating unit 24 has a rectangular fourth box 241. A fourth motor 242 and a rotating shaft 244 are fixed in two opposite ends of the fourth box 241, respectively. A fourth clutch 243 is connected between the fourth motor 242 and the rotating shaft 244. The rotating shaft 244 passes through the fourth box 241 to be exposed from a bottom of the fourth box 241 for being connected with an electric iron 40. The rotating unit 24 is disposed vertically with an end which the fourth motor 242 is located at top.

Referring to FIG. 1, FIG. 2 and FIG. 6, the electric iron 40 fixed on one end of the rotating shaft 244 of the rotating unit 24 has a heating portion 41 and a feed finger 42 connected with the heating portion 41. The heating portion 41 has a receiving tube 411 with a heating thread (not shown) received therein. The heating thread is electrically connected with an outer electric wire (not shown) by means of terminals (not shown) so as to be electrically connected with the temperature controlling module. The heating thread is connected with the outer electric wire by means of terminals so as to facilitate the replacement of the heating thread.

Figure 7:
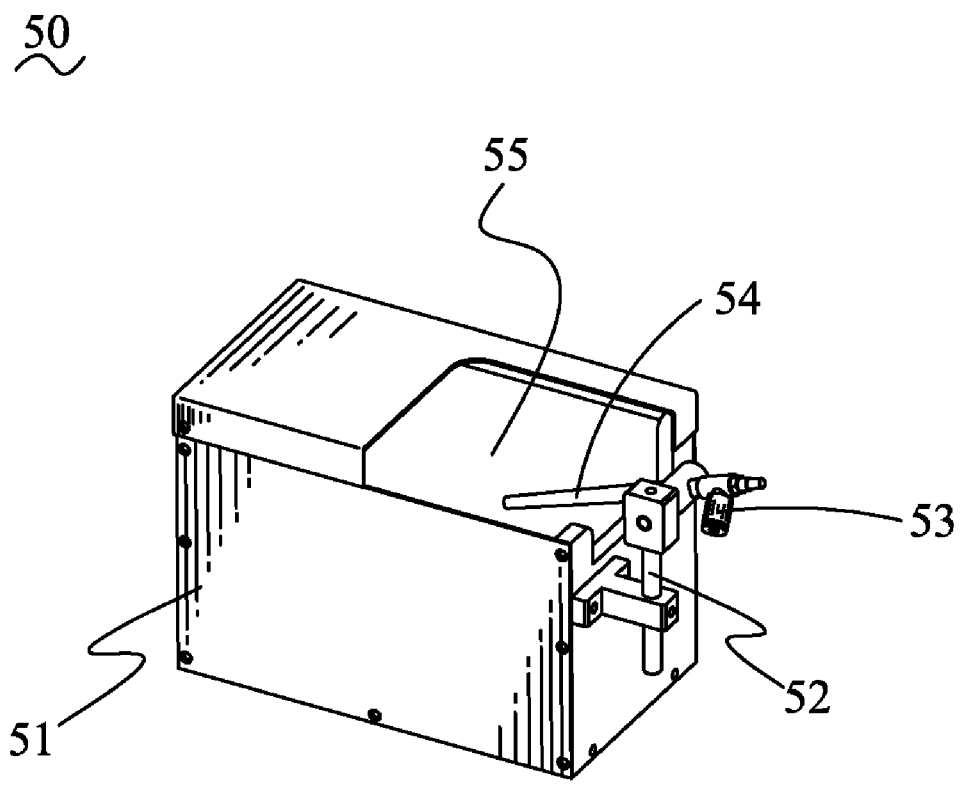
FIG. 7 is a perspective view of an automatic cleaning device of the automatic soldering machine of FIG. 1.

Referring to FIG. 7, the automatic cleaning module 50 is fixed on the base board 111 of the base frame and located under the electric iron 40. The automatic cleaning module 50 has a rectangular case 51 with an opening 55 facing the electric iron 40. A fixing bracket 52 is fixed on a side of the case 51 which is near to the electric iron 40. The fixing bracket 52 is provided with a control valve 53 fastened thereon. One end of the control valve 53 is connected with one end of a pipeline 54. The other end of the pipeline 54 further stretches into the case 51 from the opening 55. The other end of the control valve 53 is connected with an outer gas providing device (not shown) for controlling run-off of gas which passes through the control valve 53 from the outer gas providing device to the case 51.

Referring to FIG. 1, FIG. 2 and FIG. 6, in assembly, the first driving unit 21 is disposed on the supporting bars 112 to make the first leading element 219 move along an X axis. The first support panel 121 is levelly fixed on the two first holding walls 2101 of the first leading element 219. The second support panel 122 is disposed vertically to be connected to a side of the first support panel 121. The third driving unit 23 is disposed vertically to make the third leading element 239 move along a Z axis perpendicular to the X axis. A bottom of the third box 231 of the third driving unit 23 is fixed on the first support panel 121. A lower portion of a side of the third box 231 is fixed to the second support panel 122. The second driving unit 22 is disposed to make the second leading element 229 move along a Y axis perpendicular to the X axis and the Z axis. The second box 221 of the second driving unit 22 is connected with two third holding walls 2301 of the third leading element 239 by a side opposite to the second leading element 229. A side of the fourth box 241 of the rotating unit 24 is connected with two second holding walls 2201 of the second leading element 209. The third support panel 123 is further connected with the two second holding walls 2201 of the second leading element 229. The receiving device 113 is fixed on the third support panel 123. The temperature controlling module is set in the receiving device 113 for controlling the temperature of the electric iron 40 and the sending tin module is set in the receiving device 113 with a guiding tube 31 stretching out of a bottom of the receiving device 113, respectively. The guiding tube 31 is abutted against one end of the feed finger 42 of the electric iron 40 for sending soldering tin (not shown) to the electric iron 40.

The first driving unit 21 and the electric iron 40 form an indirect connection therebetween by means of the two first holding walls 2101 of the first driving unit 21 being connected with the first support panel 121, the first support panel 121 further being connected with the bottom of the third box 231 of the third driving unit 23, the two third holding walls 2301 of the third driving unit 23 further being connected with the second box 221 of the second driving unit 22, the two second holding walls 2201 of the second driving unit 22 further being connected with the fourth box 241 of the rotating unit 24 and the rotating shaft 244 of the rotating unit 24 further being connected with the electric iron 40 so that makes the electric iron 40 move along the X axis when the first motor 217 starts. The second driving unit 22 and the electric iron 40 form an indirect connection therebetween by means of the two second holding walls 2201 of the second driving unit 22 being connected with the fourth box 241 of the rotating unit 24 and the rotating shaft 244 of the rotating unit 24 further being connected with the electric iron 40 so that makes the electric iron 40 move along the Y axis when the second motor 227 starts. The third driving unit 23 and the electric iron 40 form an indirect connection therebetween by means of the two third holding walls 2301 of the third driving unit 23 being connected with the second box 221 of the second driving unit 22, the two second holding walls 2201 of the second driving unit 22 further being connected with the side of the fourth box 241 of the rotating unit 24 and the rotating shaft 244 of the rotating unit 24 further being connected with the electric iron 40 so that makes the electric iron 40 move along the Z axis when the third motor 237 starts. Therefore, the electric iron moves along the X axis, the Y axis or the Z axis when the first driving unit 21, the second driving unit 22 or the third driving unit 23 moves. The rotating unit 24 also can rotate when the fourth motor 242 starts. Therefore, the electric iron 40 can randomly move to a specified position at a predetermined area by the cooperation of the X axis movement, the Y axis movement, the Z axis movement and the rotating movement of the rotating shaft 244.

In use, the automatic soldering machine 1 is electrically connected with an external power supply (not shown) through the programming controlling module and with all of the parameters of the programming controlling module set for controlling the automatic soldering machine 1. The electric iron 40 can be randomly moved to a specified position at a predetermined area driven by the first driving unit 21, the second driving unit 22, the third driving unit 23 and the rotating unit 24. The sending tin module sends soldering tin to the feed finger 42 of the electric iron 40 through the guiding tube 31. Then the soldering tin is melt by the feed finger 42 so as to be soldered with a soldered means (not shown). The sending tin module can also adjust volume of the soldering tin according to size of soldering point (not shown) of the soldered means and sending speed of the soldering tin according to working temperature of the electric iron 40 so as to avoid missing soldering and excess soldering. The electric iron 40 automatically stretches into the case 51 of the automatic cleaning module 50 through the opening 55 for being close to the end of the pipeline which stretches into the case 51 periodically controlled by the programming controlling module so as to make the feed finger 42 of the electric iron 40 cleaned. The case 51 can also receive residua of the soldering tin fallen from the feed finger 42 of the electric iron 40 therein. The automatic soldering machine 1 can be moved around conveniently by means of disassembling the frame assembly which is fixed on the omnidirectional movable module 20 and the automatic cleaning module 50.

As described above, the automatic soldering machine 1 utilizes the omnidirectional movable module 20 for making the electric iron 40 randomly move to a specified position so as to make the soldering process simple.

The forgoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. An automatic soldering machine controlled by a controlling module, comprising:
   a frame assembly;
   an electric iron; and
   a movable module fixed on the frame assembly for making the electric iron connected with the movable module randomly move to a specified position at a predetermined area, the movable module including a first driving unit having a first leading element movable along a first axis, a second driving unit having a second leading element movable along a second axis perpendicular to the first axis, a third driving unit having a third leading element movable along a third axis perpendicular to the first and second axis and a rotating unit capable of rotating around an axis thereof, the third driving unit being connected with the first leading element, the second driving unit being connected with the third leading element, the rotating unit being connected with the second leading element, the electric iron being fixed with one end of the rotating unit.

2. The automatic soldering machine as claimed in claim 1, wherein the first driving unit has a first box, a first threaded shaft is disposed in the first box along a direction as the first axis, a first sliding block is movably disposed on the first threaded shaft and a first motor is connected with one end of the first threaded shaft, the first leading element of board shape is fixed on the first sliding block in order to move along the first axis when the first motor starts.

3. The automatic soldering machine as claimed in claim 2, wherein the first box has a first cover removably mounted to edges of sideboards thereof, two opposite edges of the first leading element are protruded perpendicularly to form two first holding walls exposed out of the first box and abutting against the first cover therebetween for supporting a first support panel where the third driving unit is fixed.

4. The automatic soldering machine as claimed in claim 2, wherein the first box further receives a pair of first rails disposed at two opposite sides of the first threaded shaft and paralleling to the first threaded shaft respectively, at least one first guiding block is movably disposed on each of the first rails respectively and disposed at two opposite sides of the first sliding block, the first leading element is fixed on the first sliding block and the first guiding blocks.

5. The automatic soldering machine as claimed in claim 2, wherein a first clutch is connected between the first threaded shaft and the first motor which is connected with and controlled by the controlling module.

6. The automatic soldering machine as claimed in claim 1, wherein the first driving unit is levelly disposed, the third driving unit is vertically disposed with a bottom connected with the first leading element, the second driving unit is disposed perpendicularly to the first and second driving units, the second driving unit is connected with the third leading element by a side thereof opposite to the second leading element, the rotating unit is connected with the second leading element.

7. The automatic soldering machine as claimed in claim 6, wherein the first driving unit has a first box, the first box has a first cover removably mounted to edges of sideboards thereof, the first leading element is disposed in the first box, two opposite edges of the first leading element are protruded perpendicularly to form two first holding walls exposed out of the first box and abutting against the first cover therebetween.

8. The automatic soldering machine as claimed in claim 7, wherein the first holding walls of the first leading element support a first support panel thereon, the third driving unit is fixed on the first support panel, the third driving unit is vertically fixed on the first support panel.

9. The automatic soldering machine as claimed in claim 1, wherein the rotating unit has a rotating shaft capable of rotating around a center axis thereof, the electric iron is fixed with one end of the rotating shaft.

10. The automatic soldering machine as claimed in claim 9, wherein the rotating unit has a fourth box, the rotating shaft is disposed in the fourth box, a fourth motor is connected with one end of the rotating shaft.

11. The automatic soldering machine as claimed in claim 10, wherein a fourth clutch is connected between the rotating shaft and the fourth motor which is connected with and controlled by the controlling module.

\* \* \* \* \*